C. O. L. CARDELL.
BELT FASTENER.
APPLICATION FILED MAR. 15, 1909.
949,519.
Patented Feb. 15, 1910.
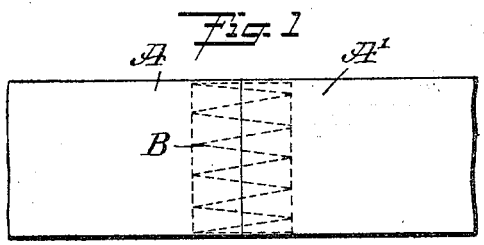
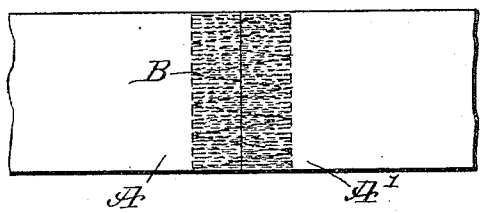
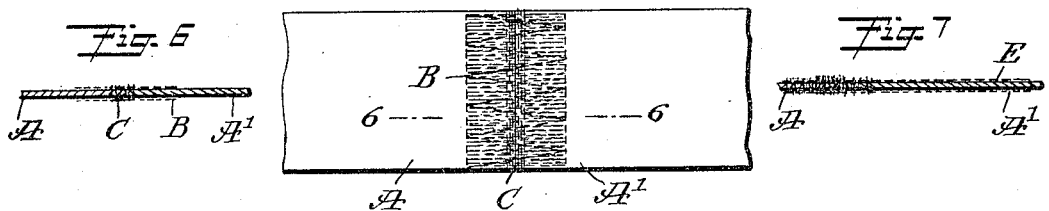
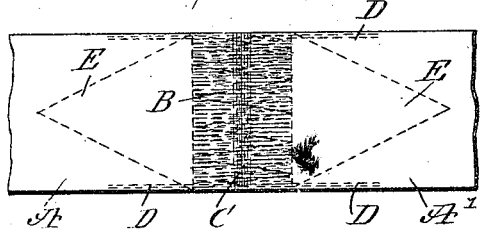
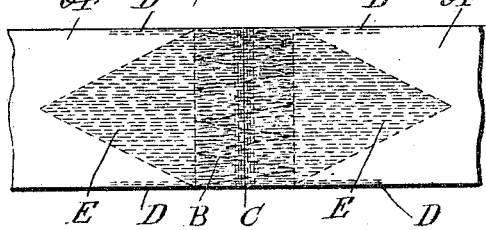
WITNESSES
E. G. Bromley.
Theo. G. Hooster.
INVENTOR
Charles O. L. Cardell
BY Munn & Co.
ATTORNEYS

UNITED STATES PATENT OFFICE.

CHARLES O. L. CARDELL, OF PEARL RIVER, NEW YORK.

BELT-FASTENER.

949,519.	Specification of Letters Patent.	Patented Feb. 15, 1910.

Application filed March 15, 1909. Serial No. 483,561.

*To all whom it may concern:*

Be it known that I, CHARLES O. L. CARDELL, a citizen of the United States, and a resident of Pearl River, in the county of Rockland and State of New York, have invented a new and Improved Belt-Fastener, of which the following is a full, clear, and exact description.

The invention relates to fabric belts, such as are used on paper folding machines, printing presses and other machines, and its object is to provide a new and improved belt fastener or joint for securely connecting the ends of the belt with each other and in such a manner that the belt is exceedingly flexible at the joint, is not liable to fray or ravel at the juncture or at the sides of the joint, and the belt is guided to run centrally on the crowns of the belt pulleys over which the belt passes. For the purpose mentioned, the joint is formed wholly by sewing, that is, by connecting the ends of the belt by zigzag stitchings running in the direction of the length of the belt, and then applying transverse stitching along both ends.

A practical embodiment of the invention is represented in the accompanying drawings forming a part of this specification, in which similar characters of reference indicate corresponding parts in all the views.

Figure 1 is a plan view of the belt and showing some of the zigzag stitchings for connecting the non-raveled ends of the belt with each other; Fig. 2 is a plan view of the same, showing the final connection of the ends of the belt by the completed zigzag stitchings; Fig. 3 is a plan view of the same, showing the transverse stitchings added; Fig. 4 is a like view of the same, showing the side stitchings and the outline of the guiding stitchings added; Fig. 5 is a plan view of the completed joint of the belt; Fig. 6 is a longitudinal section of the improvement on the line 6—6 of Fig. 3; and Fig. 7 is a similar view of the same on the line 7—7 of Fig. 5.

The terminals of the ends A and A' of the fabric belt abut one against the other, as plainly shown in Fig. 1, and then the abutting ends are united with each other by zigzag stitchings B, running in the direction of the length of the belt and alternately from one end to the other, as will be readily understood by reference to Figs. 1 and 2. Fig. 1 shows a part of the zig zag stitchings E, and Fig. 2 illustrates the completion of said zig zag stitchings, the parts being shown filled with the stitching. After the ends A and A' are united in the manner described, the joint is reinforced by transverse stitchings C, extending on both ends adjacent to the joint and of a width somewhat less than that of the zigzag stitchings B.

In order to prevent unraveling of the sides of the belt at the joint, longitudinal stitchings D are applied to both ends, as plainly shown in Fig. 4, the ends of the longitudinal stitchings D being a distance beyond the zigzag stitchings B.

In order to properly guide the belt onto the middle of the crown of the pulley over which passes the belt, guiding stitchings E are provided on opposite sides of the joint, as plainly shown in Fig. 5, the guiding stitchings having a peak-shaped outline with the peaks in the middle of the belt and with the bases extending transversely thereof, preferably at the sides of the zigzag stitchings B. In Fig. 4 is shown the peak shaped outline of the guiding stitchings and Fig. 5 shows the parts filled with the guiding stitching. The peaks of the guiding stitchings E are a distance beyond the ends of the side stitchings D, so that when the joint approaches a pulley, the peak of the corresponding advancing stitching E passes onto the middle of the crown, and the sides of the peak-shaped stitchings E then pass equally on both sides of the middle of the crown, and consequently the belt remains centrally on the pulley during the time the joint passes over the pulley.

From the foregoing it will be seen that by the arrangement described, an exceedingly strong and durable connection is had between the ends of the belt, and the belt is prevented from fraying at the abutting ends or at the sides of the joint, and the belt is guided centrally on the pulley to keep the belt always in proper position to do good work.

Having thus described my invention, I claim as new and desire to secure by Letters Patent:

1. A flexible belt having its non-raveled ends abutting, zigzag stitchings running in the direction of the length of the belt and connecting the abutting ends of the belt with each other, transverse reinforcing stitchings at the abutting ends of the belt, and guiding stitchings on opposite sides of the joint for guiding the belt onto the middle of the crown of the pulley over which the belt passes.

2. A flexible belt having its non-raveled ends abutting, zigzag stitchings running in the direction of the length of the belt and connecting the abutting ends of the belt with each other, transverse reinforcing stitchings at the abutting ends of the belt, longitudinal stitchings along the sides of the belt to prevent the sides from fraying, the said side stitchings extending beyond the zigzag stitchings, and peak-shaped guiding stitchings on opposite sides of the joint, the peaks extending beyond the ends of the longitudinal side stitchings and being in the middle of the belt and the bases extending transversely of the belt.

In testimony whereof I have signed my name to this specification in the presence of two subscribing witnesses.

CHARLES O. L. CARDELL.

Witnesses:
 THEO. G. HOSTER,
 JOHN P. DAVIS.